April 18, 1939.  O. P. WODACK ET AL  2,154,651
TOOL RETAINER FOR PORTABLE POWER DRIVEN TOOLS
Filed March 4, 1937
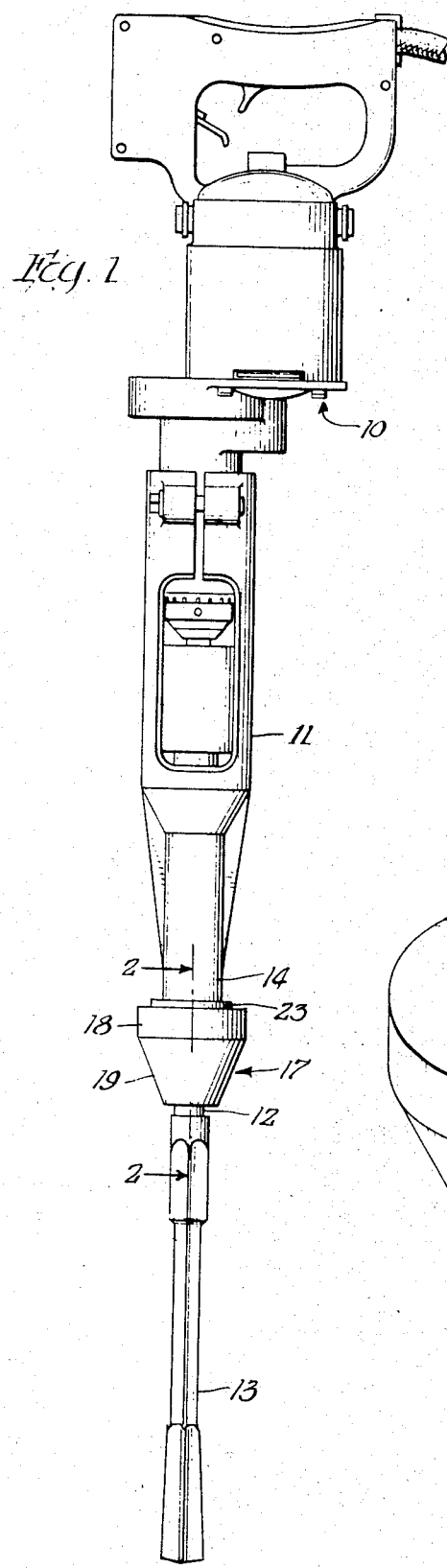
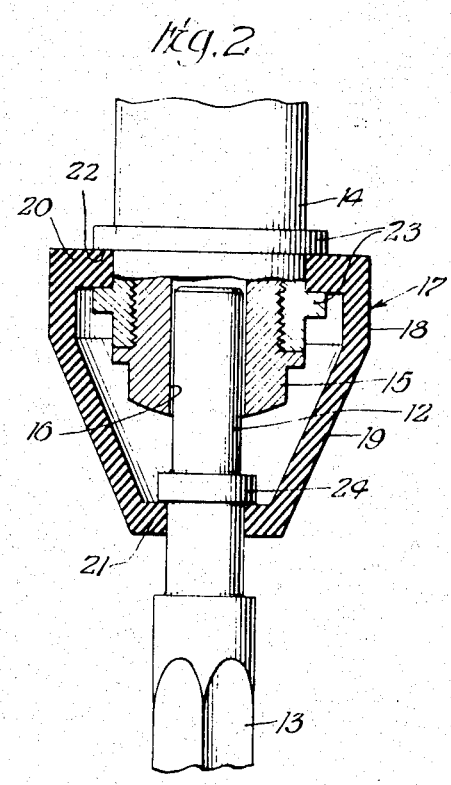
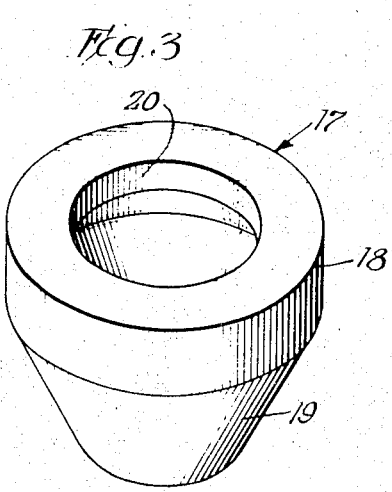
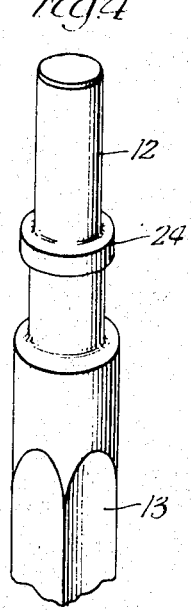
Inventors
Oscar P. Wodack
Hugo M. Zschau
By Parker, Carlson, Pitzner & Hubbard
Attorneys Patented Apr. 18, 1939

2,154,651

UNITED STATES PATENT OFFICE 2,154,651

TOOL RETAINER FOR PORTABLE POWER DRIVEN TOOLS

Oscar P. Wodack and Hugo M. Zschau, Chicago, Ill., assignors to Wodack Electric Tool Corporation, Chicago, Ill., a corporation of Illinois Application March 4, 1937, Serial No. 128,924

2 Claims. (Cl. 279—19.6)

The invention relates generally to portable power operated tools and more particularly to a tool retaining device therefor.

The general object of the invention is to provide a tool retainer for drills, hammers, and the like, which is simple and rugged in construction and which is adapted to be fitted on the drill or the like without special machining of the cooperating interfitting parts of the retainer, thus minimizing the total cost of manufacture.

Another object of the invention is to provide a novel form of tool retainer adapted to form a substantially dust-proof joint between the moving parts of the machine without the necessity of exactitude in the dimensions for the interfitting parts, the retainer being rugged in construction and economical to manufacture.

Further objects and advantages of the invention will become apparent as the following description proceeds and the features of novelty which characterize the invention are pointed out with particularity in the claims annexed to and forming a part of this specification.

For a better understanding of the invention reference may be had to the accompanying drawing in which Figure 1 is a side elevation of a hammer embodying the features of the invention.

Fig. 2 is an enlarged fragmentary sectional view taken along the line 2—2 in Fig. 1.

Fig. 3 is an enlarged perspective view of the tool retainer included in the hammer shown in Fig. 1.

Fig. 4 is an enlarged fragmentary perspective view of the shank of the star drill included in the hammer shown in Fig. 1.

The invention is applicable to portable power driven tools of the type employing a reciprocatory tool element and has been shown herein by way of illustration as applied to an electric hammer having a main body portion 10 equipped with an attachment 11 embodying a reciprocating mechanism for applying successive power impulses to a shank 12 of a star drill 13. The attachment 11 is constructed to provide a barrel 14 adapted to receive the shank 12 of the drill 13. The nose of the barrel is formed by a nut 15 (Fig. 2) threaded therein and having a hexagonal opening 16 in which the drill shank is inserted. The invention herein contemplated relates to the provision of means of an improved character for retaining the drill in operative position in the barrel.

In accordance with the present invention a tool retainer designated generally by the numeral 17 is provided which comprises a generally tubular flexible resilient sleeve fitting about the end of the barrel 14 and the shank 12 of the tool 13 in telescoping relation, the retaining sleeve, barrel and tool shank being provided with complemental interfitting projections for detachably maintaining the sleeve in engagement therewith. In the paricular form illustrated, the retaining sleeve 17 is made of flexible rubber and includes a generally cylindrical body portion 18 surrounding the barrel 14 as well as a tapered or conical nose portion 19 surrounding the tool shank 12. Internal annular flanges 20 and 21 are formed on the sleeve 17 adjacent its opposite ends cooperating respectively with interfitting projections on the barrel to maintain the sleeve in position and with a shoulder on the tool shank to limit its path of reciprocatory movement.

As best shown in Fig. 2, the upper annular flange 20 on the retaining sleeve 17 is preferably positioned in a groove 22 defined by continuous annular flanges 23 formed on the exterior of the barrel 14. In view of the resilient character of the sleeve 17, a fairly wide tolerance in the dimensions of the groove 22 is permissible without impairing the tightness of the joint so that the flanges 23 may be simply cast on the barrel without the necessity for careful machining or other finishing. Similarly, the flange 21 on the lower end of the sleeve 17 resiliently engages the tool shank 12 to form a dust-tight fit therewith despite small variations in shank diameter. An integral collar 24 on the tool shank 12 forms a radially projecting shoulder which is yieldably engaged by the sleeve flange 21 to limit outward movement of the drill.

In applying the retainer sleeve 17 to the mechanism illustrated, the resilient character of the upper flange 20 permits it to be readily forced over the lower barrel flange 23 and into the groove 22. The drill 13 may be subsequently inserted by forcing the shoulder 24 through the opening in the lower end of the sleeve 17. It will thus be seen that the retaining sleeve can be applied without any complicated manipulation of parts and forms a compact rugged joint. Moreover, the resilient engagement of the sleeve with the tool and barrel prevents the entrance of dust or other foreign matter into the tool mechanism. This is particularly advantageous in the event that a ceiling or other structure above the operator's head is being worked on in which case a large amount of dust sifts down over the tool.

Although a particular embodiment of the invention has been shown and described in some detail for purposes of illustration, there is no intention to thereby limit the invention to this particular form but, on the other hand, the appended claims are intended to cover all modifications within the spirit and scope of the invention.

We claim as our invention:

1. The combination with a portable power actuated tool embodying a stationary barrel and a detachable tool disposed for endwise reciprocation therein of a flexible rubber retaining sleeve telescoped over adjacent portions of the barrel and the tool, said sleeve being provided with spaced integral internal flanges adjacent the opposite ends thereof, said flange on the outer end of said sleeve closely embracing the shank of said tool thereby preventing the entrance of dust and other foreign matter into the interior of said barrel, means on said barrel engaging one of said flanges, and means including a shoulder on said tool located on the inner side of the other of said flanges and abutting against the same for positively limiting the outward movement of said tool from said barrel.

2. As an article of manufacture a sleeve-shaped tool retainer fashioned as a single integral structure from pliable resilient rubber for use in a portable power tool having a stationary barrel and a tool reciprocable in one end thereof, said sleeve-shaped retainer being provided with integral internal annular flanges adjacent the opposite ends thereof and adapted to overlie opposed projections on the barrel and tool respectively to yieldingly but positively limit the outward endwise movement of the tool with respect to the barrel.

OSCAR P. WODACK.
HUGO M. ZSCHAU.